(12) United States Patent  
Ruan et al.

(10) Patent No.: US 12,296,477 B2  
(45) Date of Patent: May 13, 2025

(54) GRIPPER MECHANISM

(71) Applicant: SHANDONG JIAOTONG UNIVERSITY, Jinan (CN)

(72) Inventors: Jiuhong Ruan, Jinan (CN); Xingyu Guo, Jinan (CN); Fuguang Yang, Jinan (CN); Haiyan Wang, Jinan (CN); Guodong Li, Jinan (CN); Jiao Gao, Jinan (CN)

(73) Assignee: SHANDONG JIAOTONG UNIVERSITY, Jinan (CN)

( * ) Notice: Subject to any disclaimer, the term of this patent is extended or adjusted under 35 U.S.C. 154(b) by 0 days.

(21) Appl. No.: 18/575,234

(22) PCT Filed: Oct. 24, 2023

(86) PCT No.: PCT/CN2023/126057  
§ 371 (c)(1),  
(2) Date: Dec. 28, 2023

(87) PCT Pub. No.: WO2024/198319  
PCT Pub. Date: Oct. 3, 2024

(65) Prior Publication Data  
US 2025/0128406 A1 Apr. 24, 2025

(30) Foreign Application Priority Data

Mar. 24, 2023 (CN) .......................... 202310296517.9

(51) Int. Cl.  
B25J 9/10 (2006.01)

(52) U.S. Cl.  
CPC ..................................... B25J 9/109 (2013.01)

(58) Field of Classification Search  
CPC ....................................................... B25J 9/109  
See application file for complete search history.

(56) References Cited

U.S. PATENT DOCUMENTS

| 4,903,539 | A | * | 2/1990 | Toyoda | .................... | B25J 9/042 |
| | | | | | | 901/17 |
| 4,951,517 | A | * | 8/1990 | Azuma | .................... | F16H 13/02 |
| | | | | | | 414/744.5 |
| 4,974,641 | A | * | 12/1990 | Yarita | .................... | D03D 45/20 |
| | | | | | | 901/17 |

(Continued)

FOREIGN PATENT DOCUMENTS

| CN | 107965334 A | 4/2018 |
| CN | 115472538 A | 12/2022 |

(Continued)

*Primary Examiner* — Stephen A Vu

(57) ABSTRACT

A gripper mechanism is provided, which relates to the technical field of grippers. The gripper mechanism includes a motor, a cylinder barrel, a piston and a guide assembly. The piston reciprocates in the cylinder barrel under the action of the motor and the guide assembly. The piston includes a piston body and a piston rod located in the piston body. Both ends of the cylinder barrel are respectively provided with cylinder heads for limiting the maximum distance and the minimum distance between the piston body and a part to be gripped. The piston rod includes a driving shaft, a cross slider coupling and a gripping head which are connected in turn. The power output by the motor is transmitted to the gripping head through the driving shaft and the cross slider coupling in turn.

9 Claims, 6 Drawing Sheets

(56) References Cited

U.S. PATENT DOCUMENTS 5,655,988 A * 8/1997 Schnell .................... F16H 1/28
　　　　　　　　　　　　　　　　　　　　　　475/341
8,568,079 B2 * 10/2013 Walthers ............ B66F 9/07509
　　　　　　　　　　　　　　　　　　　　　　414/620

FOREIGN PATENT DOCUMENTS

| CN | 115476133 A | 12/2022 |
| CN | 115990903 | 4/2023 |

* cited by examiner

GRIPPER MECHANISM

CROSS-REFERENCE TO RELATED APPLICATION

This application is a national stage application of International Patent Application No. PCT/CN2023/126057, filed on Oct. 24, 2023, which claims the priority of Chinese Patent Application No. 202310296517.9 entitled "GRIPPER MECHANISM" filed with the Chinese Patent Office on Mar. 24, 2023, which is incorporated herein by reference in its entirety.

TECHNICAL FIELD

The present disclosure relates to the technical field of grippers, in particular to a gripper mechanism.

BACKGROUND

The gripping device is wide in application range, ranging from bolt threading, workpiece gripping and workpiece assembling to segment assembling. The gripping device is necessary to adjust the position and posture of the end manipulator. The gripping device with simple structure and automatic alignment and automatic reset functions can improve the adjustment accuracy of the end manipulator. Most of the existing gripping devices are free of automatic aligning function, and the gripping device with an aligning function is complex in structure. Examples are as follows.

The patent application CN202211354828.8 discloses a gripping device. The gripping device includes an eccentric locating mechanism and a gripper mechanism. The eccentric locating mechanism includes a supporting assembly and a floating assembly. The gripper mechanism includes a gripping assembly and a triggering assembly. The gripping assembly includes a gripping jaw and a gripping driving source. The triggering assembly includes triggering pieces and triggering inductors. The gripper mechanism moves to the position where a workpiece is located. When the position of the workpiece is offset or a set angle of the workpiece is inclined, after a triggering piece abuts against the workpiece, the floating assembly is floated and connected with the supporting assembly through a connecting piece, so that the connecting piece can drive the floating assembly to float relative to the supporting assembly until other triggering pieces can abut against the workpiece, and at this time, the triggering inductors of all the triggering pieces are triggered. The gripping assembly in the patent application is connected with the floating assembly, and the gripping assembly floats synchronously with the floating assembly, so that the gripping jaw is effectively aligned with the clamping position of the workpiece, and then clamping movement is driven by the gripping driving source, so that stable clamping of the workpiece is realized, and the gripping jaw is effectively avoided from bumping the workpiece. The structure in the patent application is complex and is free of the function of automatic reset.

The patent application CN201711251808.7 provides a segment gripper mechanism for a shield machine assembler. The gripping disc of the segment gripper mechanism for a shield machine assembler is used for gripping the segment assembling head on the segment through a gripping oil cylinder arranged at the central position of the segment gripping disc and a gripping head connected with a cylinder rod of the gripping oil cylinder. The cylinder rod of the gripping oil cylinder is directly connected with the gripping head. The gripping head is free of the function of automatic alignment, and the force of the gripping head is directly transmitted to the cylinder rod of the gripping oil cylinder. If the gripping head collides with the segment accidentally during the segment assembly process, the gripping oil cylinder has potential risk of damage.

The patent application CN202211344075.2 provides a slide arranging machine with wide application range and a slide arranging method. A gripper mechanism of the slide arranging machine includes a gripping assembly, an adjusting assembly and a rotating assembly. The rotating assembly is connected with the gripping assembly. The adjusting assembly is connected with the gripping assembly. The adjusting assembly is used for adjusting the position of the gripping assembly, so that the clamping accuracy of the slide arranging machine is improved. The slide arranging method includes the following steps: adjusting the gripping range of the gripping assembly by the adjusting assembly, driving the gripper mechanism to grip a lead frame by the driving mechanism and transferring the gripped lead frame to a stacking mechanism, rotating the gripping assembly by the rotating assembly, and then placing the lead frame at the stacking mechanism, thereby improving the clamping accuracy of the slide arranging machine. The gripper mechanism is free of passive degree of freedom, so the gripper mechanism is free of the function of automatic alignment.

SUMMARY

The present disclosure aims to solve one of the technical problems in the related art at least to some extent.

Therefore, a gripper mechanism capable of reducing the alignment accuracy requirement of a part to be gripped provided by the embodiment of the present disclosure includes a motor C1, a cylinder barrel C2, a piston C3 and a guide assembly C4, where the piston C3 reciprocates in the cylinder barrel C2, and the piston C3 includes a piston body C31 and a piston rod C32 located in the piston body C31; both ends of the cylinder barrel C2 are respectively provided with a first cylinder head C21 and a second cylinder head C22 which are used for limiting a maximum distance and a minimum distance between the piston body C31 and a part to be gripped; the piston rod C32 includes a driving shaft 2, a cross slider coupling 1 and a gripping head 3 which are connected in turn, the gripping head 3 partly protrudes from the cylinder barrel C2, and power output by the motor C1 is transmitted to the gripping head 3 through the driving shaft 2 and the cross slider coupling 1 in turn, so that the gripping head 3 is screwed into or out of a connecting hole in the part to be gripped to grip and release the part to be gripped.

The cross slider coupling includes:
a first sleeve 11, where a first through hole 111 penetrates through a center of the first sleeve 11 in an axial direction of the first sleeve 11, the first sleeve 11 is provided with a first end face 101 and a second end face 102 respectively at both axial ends of the first sleeve 11, the first sleeve 11 is connected with the driving shaft 2 at the first through hole 111 of the first end face 101, a first arc surface 103a arranged in a first direction is formed in the second end face 102 of the first sleeve 11, and a second through hole 112 is further formed in the first sleeve 11;
a second sleeve 12, where a third through hole 121 penetrates through a center of the second sleeve 12 in an axial direction of the second sleeve 12, the second sleeve 12 is provided with a third end face 103 and a fourth end face 104 respectively at both axial ends of the second sleeve 12, the second sleeve 12 is connected with the gripping head 3 at the third through hole 121 of the third end face 103, a second arc surface 105a arranged in a second direction is formed in the fourth end face 104 of the second sleeve 12, and a fourth through hole 122 is further formed in the second sleeve 12;

a cross slider 13, where the cross slider 13 is provided with a third arc surface 103b matched with the first arc surface 103a on a side, facing the second end face 102, of the cross slider 13, so that relative rotation around the first direction and relative sliding in the first direction are able to be realized between the cross slider 13 and the first sleeve 11; the cross slider 13 is provided with a fourth arc surface 105b matched with the second arc surface 105a on a side, facing the fourth end face 104, of the cross slider 13, so that relative rotation around the second direction and relative sliding in the second direction are able to be realized between the cross slider 13 and the second sleeve 12;

a first reset assembly 14, where the first reset assembly 14 penetrates through an interior of the second through hole 112 for providing restoring force for reset of the cross slider 13 relative to the first sleeve 11 after unloading;

a second reset assembly 15, where the second reset assembly 15 penetrates through an interior of the fourth through hole 122 for providing restoring force for reset of the cross slider 13 relative to the second sleeve 12 after unloading.

In some embodiments, the first arc surface 103a is a major arc that is concave to an interior of the first sleeve 11 or convex to an exterior of the first sleeve 11.

In some embodiments, the second arc surface 105a is a major arc that is concave to an interior of the second sleeve 12 or convex to an exterior of the second sleeve 12.

In some embodiments, a first mounting hole 132 is formed in the side, facing the first sleeve 11, of the cross slider 13, a first limited block 131 is mounted in the first mounting hole 132, and a first limiting slot 114 for limiting a maximum displacement of the first limited block 131 sliding in the first direction is arranged on the first arc surface 103a.

In some embodiments, a second mounting hole is formed in the side, facing the second sleeve 12, of the cross slider 13, a second limited block is mounted in the first mounting hole, and a second limiting slot 124 for limiting a maximum displacement of the second limited block sliding in the second direction is arranged on the second arc surface 105a.

In some embodiments, the first reset assembly 14 includes a first spring 141 penetrating through the interior of the second through hole 112, first spiral end covers 142 arranged at both ends of the first spring 141, first screws 143 in threaded connection with the first spiral end covers 142, and first positioning plates 144 sleeving the first screws 143; the first screws 143 penetrate through the first positioning plates 144 and are screwed in threaded holes of the first spiral end covers 142, so that the first positioning plates 144 are fixed on the first sleeve 11; and an axial direction of the second through hole 112 is parallel to an axial direction of the third arc surface.

In some embodiments, the second reset assembly 15 includes a second spring penetrating through the interior of the fourth through hole 122, second spiral end covers arranged at both ends of the second spring, second screws in threaded connection with the second spiral end covers, and second positioning plates sleeving the second screws; the second screws penetrate through the second positioning plates and are screwed in threaded holes of the second spiral end covers, so that the second positioning plates are fixed on the second sleeve 12; and an axial direction of the fourth through hole 122 is parallel to an axial direction of the fourth arc surface.

In some embodiments, the driving shaft 2 and the gripping head 3 are parallel to each other or form an included angle.

In some embodiments, the cross slider coupling 1 and the gripping head 3 are connected to each other through a shaft clamp 4 for preventing the gripping head 3 from retracting into a cavity of the piston body.

The gripper mechanism provided by the embodiment of the present disclosure, relative to the prior art, has the following characteristics and beneficial effects.

Firstly, the gripper mechanism provided by the embodiment of the present disclosure has the function of automatic alignment. When the part to be gripped is gripped, as long as the gripping head contacts with the connecting hole of the part to be gripped, the motor drives the driving shaft, the cross slider coupling and the gripping head to automatically screw into the connecting hole of the part to be gripped, so that the alignment accuracy requirement of the part to be gripped can be reduced.

Secondly, after the gripper mechanism provided by the embodiment of the present disclosure is unloaded and the gripping head is suspended, the built-in cross slider coupling can be automatically reset to make preparations for the next gripping.

Thirdly, the gripper mechanism provided by the embodiment of the present disclosure can not only grip the part to be gripped where an axis of the connecting hole of the part to be gripped coincides with an axis of the gripping head, but also is suitable for the situation that the axis of the connecting hole of the part to be gripped and the axis of the gripping head form a certain included angle.

Fourthly, the built-in cross slider coupling of the gripper mechanism provided by the embodiment of the present disclosure can not only be used for the situation that both the driving shaft and the gripping head are in a horizontal direction, but also be suitable for the situation that both the driving shaft and the gripping head are in a vertical direction. That is, the cross slider coupling provided by the embodiment of the present disclosure can be used for push-pull application. Particularly, the cross slider coupling is pressed during the process that the gripping head is screwed into the part to be gripped. When the part to be gripped is lifted, the cross slider coupler is pulled. In the process of transporting and assembling the part to be gripped, the cross slider coupler may be subjected to pressure or tension according to the different conveying trajectories and mounting positions.

Fifthly, the cross slider coupling in the gripper mechanism provided by the embodiment of the present disclosure is compact in structure, and is suitable for narrow working spaces such as oil cylinders.

Sixthly, when the gripping head of the gripper mechanism provided by the embodiment of the present disclosure accidentally collides with the part to be gripped, the gripping head moves a certain distance relative to the driving shaft of the cross slider coupling and forms a certain included angle, so that the impact of accidental collision on the motor can be reduced.

The additional aspects and advantages of the present disclosure will be set forth partially in the following descrip-

REFERENCE SIGNS

Figure 1:
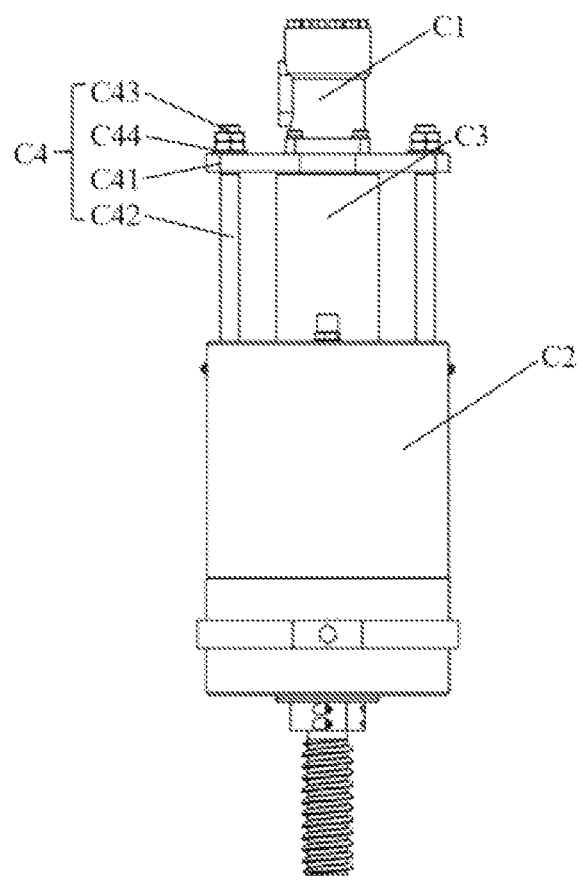
FIG. 1 is an integral structural schematic diagram of a gripper mechanism provided by the embodiment of the present disclosure.

C1 motor; C2 cylinder barrel; C21 first cylinder head; C22 second cylinder head; C23 flow nipple; C24 plug; C3 piston; C31 piston body; C311 boss; C32 piston rod; 1 cross slider coupling; 11 first sleeve; 101 first end face; 102 second end face; 103a first arc surface; 111 first through hole; 112 second through hole; 113 first locking piece; 114 first limiting slot; 12 second sleeve; 103 third end face; 104 fourth end face; 105a second arc surface; 122 fourth through hole; 123 second locking piece; 124 second limiting slot; 13 cross slider; 103b third arc surface; 105b fourth arc surface; 131 first limited block; 132 first mounting hole; 14 first reset assembly; 141 first spring; 142 first spiral end cover; 143 first screw; 144 first positioning plate; 15 second reset assembly; 2 driving shaft; 3 gripping head; 4 shaft clamp; C4 guide assembly; C41 flange; C42 guide rod; C43 nut; and C44 spring washer.

DETAILED DESCRIPTION OF THE EMBODIMENTS

In order to make the objectives, technical solutions and advantages of the present disclosure clearer, the present disclosure will be further described here with reference to the attached figures and embodiments thereof. It shall be understood that the embodiments described herein are only intended to illustrate but not to limit the present disclosure.

On the contrary, the present disclosure covers substitutions, modifications, equivalent methods and schemes within the spirit and scope of the present disclosure as defined by the claims. Further, in order for the public to have a better understanding of the present disclosure, certain specific details are described in detail in the following detailed description of the present disclosure. The present disclosure may be fully understood by those skilled in the art without the description of these detailed portions.

The structures, proportions, sizes and the like depicted in the specification are only used for being matched with the contents disclosed in the specification for people familiar with the technology to understand and read, and are not used for limiting the implementation limiting conditions of the present disclosure, so that the practical significance, modification of any structure, change of proportional relation or adjustment of the size in the technology are avoided, and without affecting the effects and achievable objectives of the present disclosure, it should still fall within the scope of what the technical content disclosed herein can cover. The terms such as "upper", "lower", "left", "right", "middle" and "one", which are used in this specification, are also used for ease of description only and are not used to limit the scope of the present disclosure, and changes or adjustments in the relative relationships are considered to be the scope of the present disclosure without substantial changes in the technical content.

Referring to FIG. 1 to FIG. 6, a motor C1, a cylinder barrel C2, a piston C3 and a guide assembly C4, where the piston C3 reciprocates in the cylinder barrel C2, and the piston C3 includes a piston body C31 and a piston rod C32 located in the piston body C31; both ends of the cylinder barrel C2 are respectively provided with a first cylinder head C21 and a second cylinder head C22 which are used for limiting a maximum distance and a minimum distance between the piston body C31 and a part to be gripped (the part to be gripped is not shown in the figures); the piston rod C32 includes a driving shaft 2, a cross slider coupling 1 and a gripping head 3 which are connected in turn, the gripping head 3 partly protrudes from the cylinder barrel C2, and power output by the motor C1 is transmitted to the gripping head 3 through the driving shaft 2 and the cross slider coupling 1 in turn, so that the gripping head 3 is screwed into or out of a connecting hole in the part to be gripped to grip and release the part to be gripped.

Figure 2:
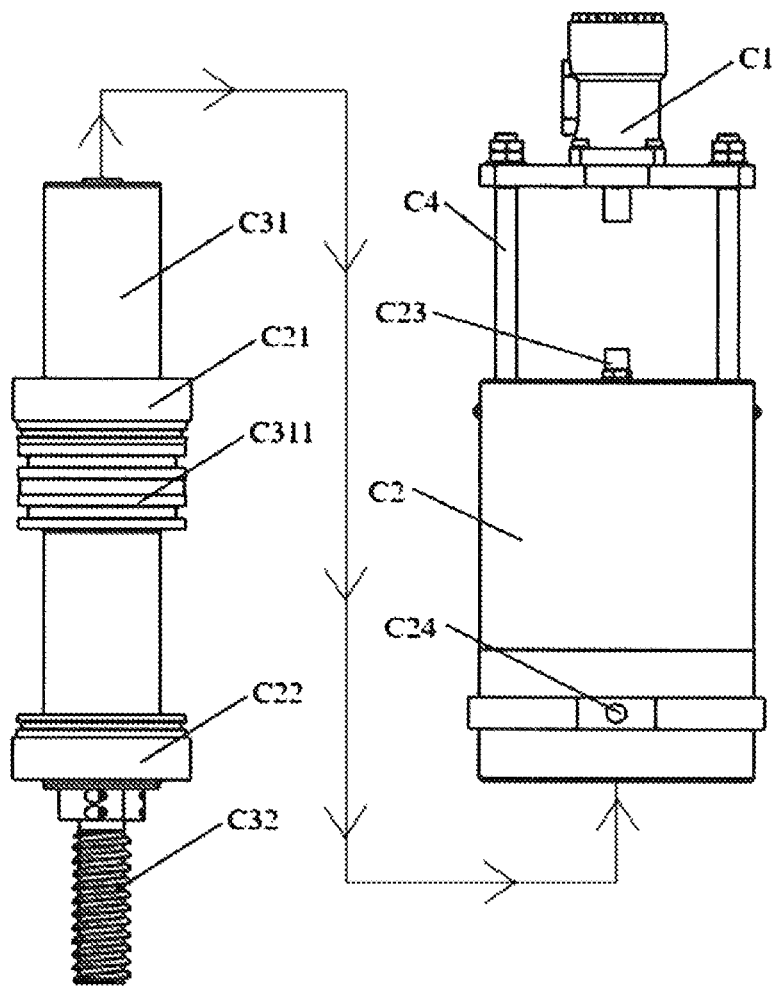
FIG. 2 is a local exploded view of a gripper mechanism provided by the embodiment of the present disclosure.
Figure 3:
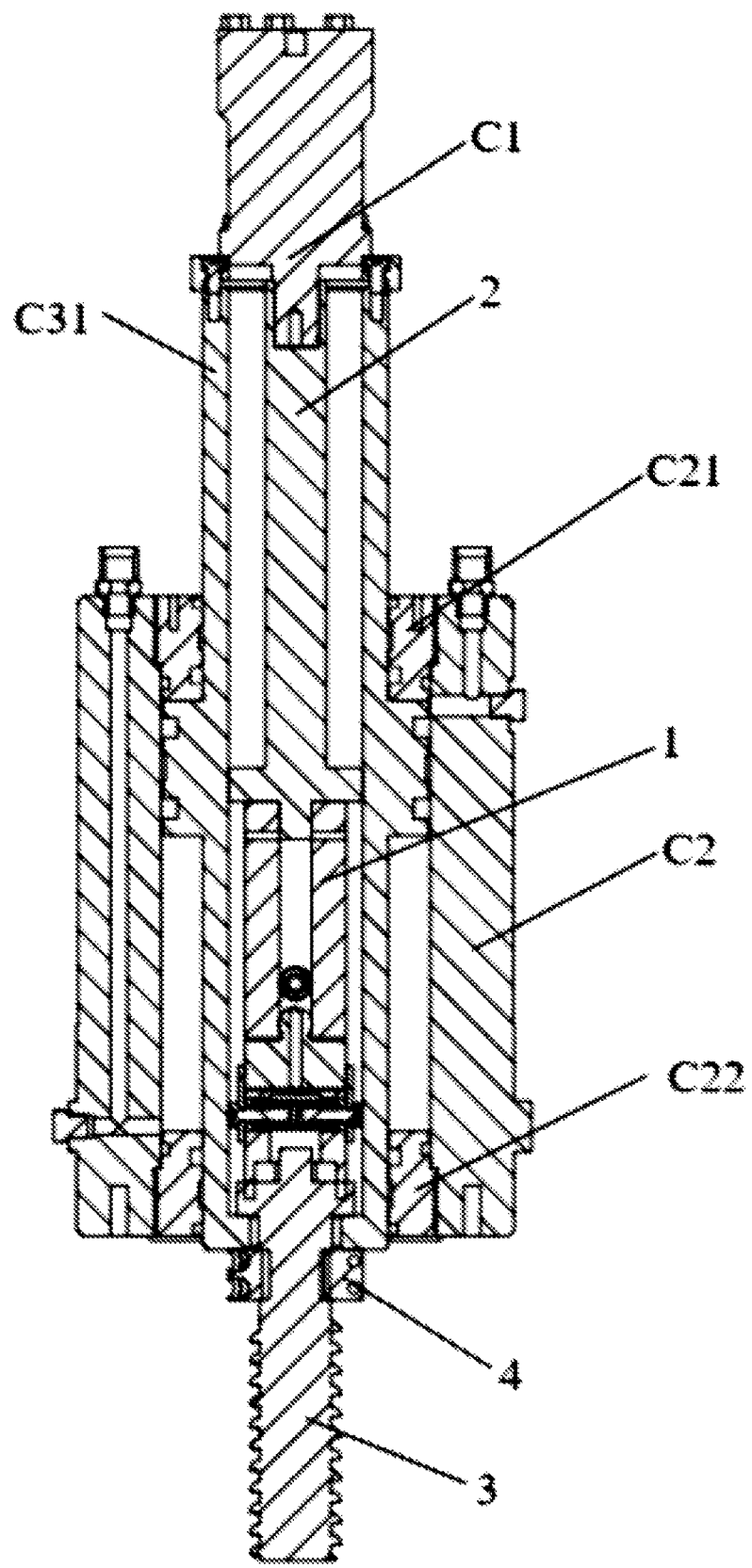
FIG. 3 is a section view of FIG. 1.
Figure 4:
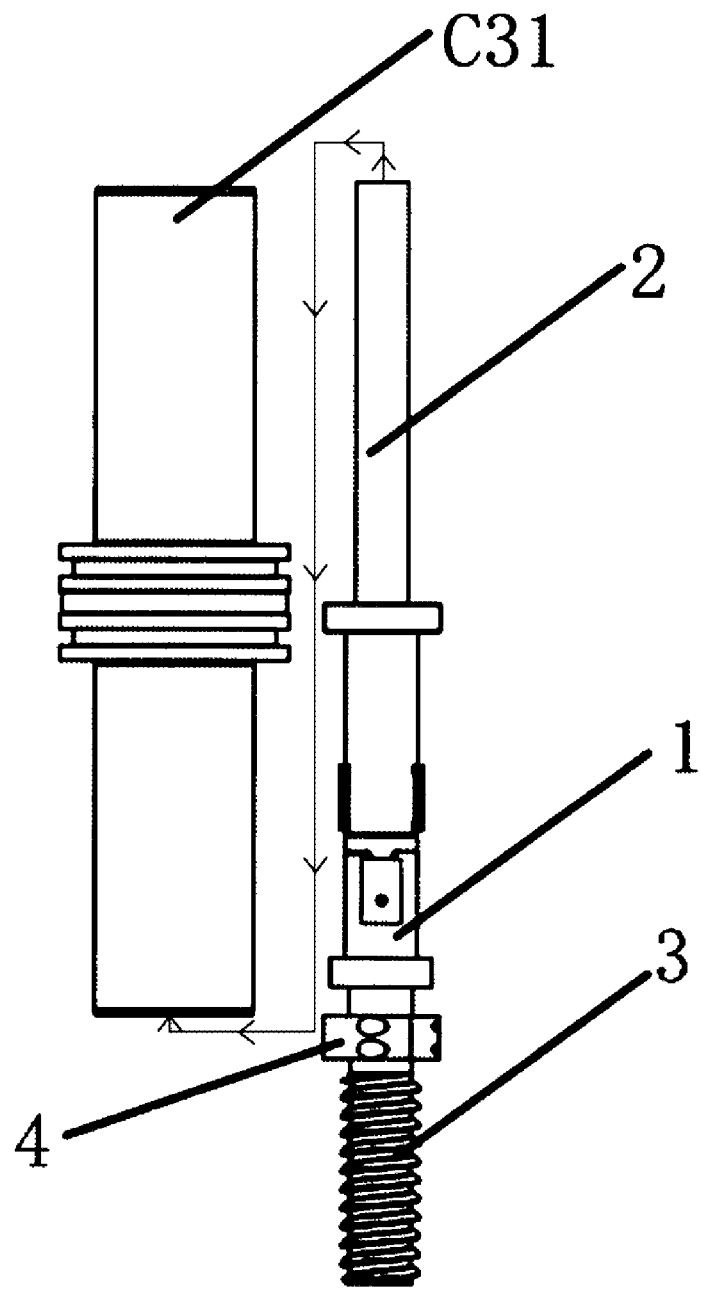
FIG. 4 is a structural schematic diagram of a piston rod in a gripper mechanism provided by the embodiment of the present disclosure.

In some embodiments, referring to FIG. 1 to FIG. 3, the guide assembly C4 includes a flange C41 and two guide rods C42. A bottom end of the motor C1 (a hydraulic motor can be used) and a top end of the flange C41 are fixedly connected and coaxially arranged. A through hole for an output shaft of the motor C1 to penetrate through is formed in the flange C41. Top ends of the two guide rods C42 are fastened to the flange C41 by locking a nut C43 and a spring washer C44, and bottom ends of the two guide rods C42 are embedded in a side wall of the cylinder barrel C2.

In some embodiments, referring to FIG. 2 and FIG. 3, the first cylinder head C21 is sealed and fastened with a top end of the cylinder barrel C2 through bolts. A flow nipple C23 for injecting hydraulic oil into the cylinder barrel C2 is arranged on the first cylinder head C21, and a plug C24 for preventing the hydraulic oil from leaking is arranged on the side wall of the cylinder barrel C2. The second cylinder head C22 is sealed and fastened with a bottom end of the cylinder barrel C2 through bolts.

In some embodiments, referring to FIG. 1 to FIG. 4, in the piston C3, the piston body C31 is on the periphery of the piston rod C32, and a top end of the piston rod C31 and a bottom end of the flange C41 of the guide assembly C4 are fixedly connected and axially arranged. The piston body C31 is a barrel provided with a boss C311 on a peripheral surface. During the reciprocating motion of the piston body C31 in the cylinder barrel C2, an upper surface of the boss C311 is limited by the first cylinder head C21, so that the piston body C31 cannot continue to move in a direction away from the part to be gripped, and the maximum distance between the piston body C31 and the part to be gripped is limited. A lower surface of the boss C311 is limited by the second cylinder head C22, so that the piston body C31 cannot continue to move in a direction approaching the part to be gripped, and the minimum distance between the piston body C31 and the part to be gripped is limited. The piston rod C32 includes a driving shaft 2, a cross slider coupling 1 and a gripping head 3 which are connected in turn. Both ends of the driving shaft 2 are respectively fixedly connected with the output shaft of the motor C1 and one end of the cross slider coupling 1, and the other end of the cross slider coupling 1 is connected with one end of the gripping head 2 through two shaft clamps 4. A hollow shaft formed between the two shaft clamps 4 is used for preventing the gripping head 3 from retracting into an inner cavity of the piston body C31.

Figure 5:
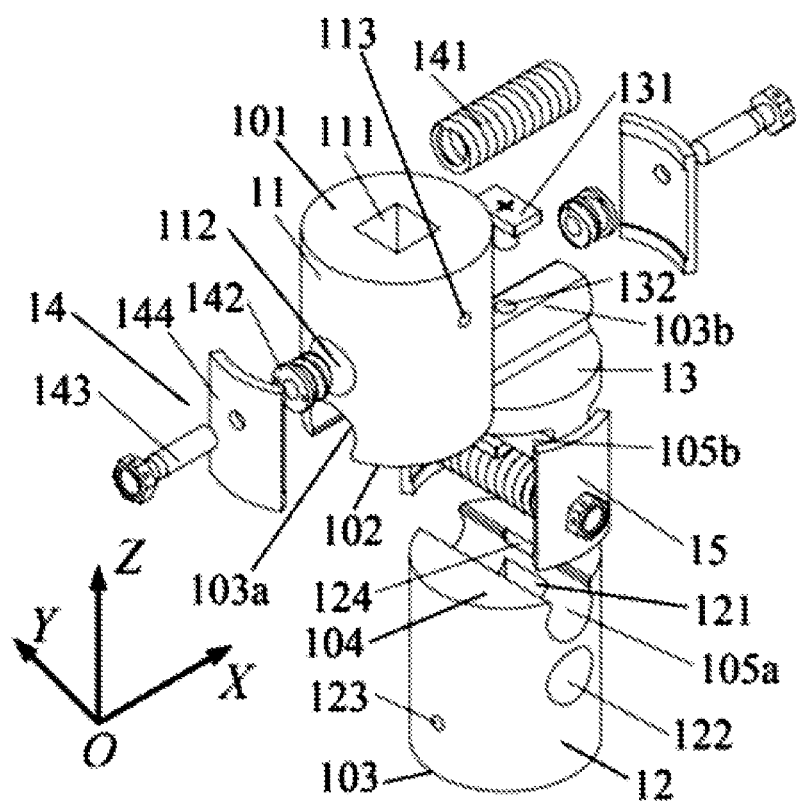
FIG. 5 is an exploded view of a cross slider coupling in a gripper mechanism provided by the embodiment of the present disclosure.
Figure 6:
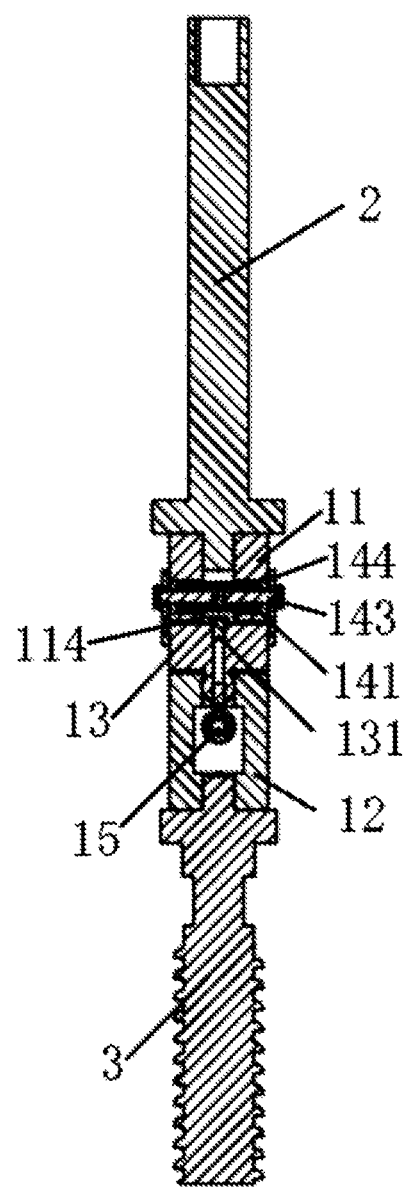
FIG. 6 is a section view of a piston rod in a gripper mechanism provided by the embodiment of the present disclosure.

In some embodiments, the structure of the cross slider coupling 1 of the piston rod C32, as shown in FIG. 5 and FIG. 6, includes:

a first sleeve 11, where a first through hole 111 penetrates through a center of the first sleeve 11 in an axial direction of the first sleeve 11, the first sleeve 11 is provided with a first end face 101 and a second end face 102 at both axial ends of the first sleeve 11, the first sleeve 11 is connected with the driving shaft 2 at the first through hole 111 of the first end face 101, a first arc surface 103a arranged in a first direction (an X-axis direction as shown in FIG. 5, an origin O of a coordinate system being located at the center of the cross slider 13 when the cross slider coupling 1 is in an initial state) is formed in the second end face 102 of the first sleeve 11, and a second through hole 112 is further formed in the first sleeve 11;

a second sleeve 12, where a third through hole 121 penetrates through a center of the second sleeve 12 in an axial direction of the second sleeve 12, the second sleeve 12 is provided with a third end face 103 and a fourth end face 104 at both axial ends of the second sleeve 12, the second sleeve 12 is connected with the gripping head 3 at the third through hole 121 of the third end face 103, a second arc surface 105a arranged in a second direction (a Y-axis direction as shown in FIG. 5) is formed in the fourth end face 104 of the second sleeve 12, and a fourth through hole 122 is further formed in the second sleeve 12;

a cross slider 13, where the cross slider 13 is provided with a third arc surface 103b matched with the first arc surface 103a on a side, facing the second end face 102, of the cross slider 13, so that relative rotation around the first direction and relative sliding in the first direction are able to be realized between the cross slider 13 and the first sleeve 11; the cross slider 13 is provided with a fourth arc surface 105b matched with the second arc surface 105a on a side, facing the fourth end face 104, of the cross slider 13, so that relative rotation around the second direction and relative sliding in the second direction are able to be realized between the cross slider 13 and the second sleeve 12;

a first reset assembly 14, where the first reset assembly 14 penetrates through an interior of the second through hole 112 for providing restoring force for reset of the cross slider 13 relative to the first sleeve 11 after unloading;

a second reset assembly 15, where the second reset assembly 15 penetrates through an interior of the fourth through hole 122 for providing restoring force for reset of the cross slider 13 relative to the second sleeve 12 after unloading.

In some embodiments, the first sleeve 11 is substantially cylindrical, and the first through hole 111 axially penetrating through the first sleeve 11 is used for realizing assembling between the first sleeve 11 and the driving shaft 2. Specifically, when the driving shaft 2 transmits pressure (or understood as thrust) to the first sleeve 11, the driving shaft 2 is directly inserted into the first through hole 111. When the driving shaft 2 transmits tension to the first sleeve 11, the driving shaft 2 and the first sleeve 11 need to be fastened through a first locking piece 113 arranged on the first sleeve 11 after the driving shaft 2 is inserted into the first through hole 111. The first locking piece 113 includes a first threaded hole formed in the first sleeve 11 and communicated with the first through hole 111, and a first bolt matched with the first threaded hole. After the first bolt is screwed into the first threaded hole, the first bolt abuts against the driving shaft 2 to form tight connection between the driving shaft 2 and the first sleeve 11. Conversely, loose connection is formed between the driving shaft 2 and the first sleeve 11 after the first bolt is screwed out of the first threaded hole. The first end face 101 and the second end face 102 of the first sleeve 11 are two planes parallel to each other or designed into end faces of other shapes according to the application scenarios and the requirements of convenient processing. The first arc surface 103a formed at the second end face 102 in the first direction is a major arc that is concave to the interior of the first sleeve 11, and the diameter of the first arc surface 103a can be ¼ to ⅓ of the diameter of the second end face 102.

In some embodiments, the second sleeve 12 is substantially cylindrical, and the third through hole 121 axially penetrating through the second sleeve 12 is used for realizing assembling between the second sleeve 12 and the gripping head 3. Specifically, when the second sleeve 12 transmits pressure (or understood as thrust) to the gripping head 3, the gripping head 3 is directly inserted into the third through hole 121. When the second sleeve 12 transmits tension to the gripping head 3, the gripping head 3 and the second sleeve 12 need to be fastened through a second locking piece 123 arranged on the second sleeve 12 after the gripping head 3 is inserted into the third through hole 121. The second locking piece 123 includes a second threaded hole formed in the second sleeve 12 and communicated with the third through hole 121, and a second bolt matched with the first threaded hole. After the first bolt is screwed into the second threaded hole, the second bolt abuts against the gripping head 3 to form tight connection between the gripping head 3 and the second sleeve 12. Conversely, loose connection is formed between the gripping head 3 and the second sleeve 12 after the second bolt is screwed out of the second threaded hole. The third end face 103 and the fourth end face 104 of the second sleeve 12 are two planes parallel to each other or designed into end faces of other shapes according to the application scenarios and the requirements of convenient processing. The second arc surface 105a formed at the fourth end face 104 in the second direction is a major arc that is concave to the interior of the second sleeve 12, and the diameter of the second arc surface 105a can be ¼ to ⅓ of the diameter of the fourth end face 104.

In some embodiments, the third arc surface 103b arranged on the cross slider 13 is a major arc that is convex to the second end face 102 of the first sleeve 11. The first arc surface 103a of the first sleeve 11 sleeves the third arc surface 103b of the cross slider 13 to realize the assembling of the first sleeve 11 and the cross slider 13. The first arc surface 103a of the first sleeve 11 serves as a sliding rail of the third arc surface 103b on the cross slider 13. Similarly, the fourth arc surface 105b arranged on the cross slider 13 is a major arc that is convex to the fourth end face 104 of the second sleeve 12. The second arc surface 105a of the second sleeve 12 sleeves the fourth arc surface 105b of the cross slider 13 to realize the assembling of the second sleeve 12 and the cross slider 13. The second arc surface 105a of the second sleeve 12 serves as a sliding rail of the fourth arc surface 105b on the cross slider 13. In addition, a first mounting hole 132 and a second mounting hole (the second mounting hole is shielded in FIG. 5 and not illustrated due to viewing angles) are respectively formed in the third arc surface 103b and the fourth arc surface 105b of the cross slider 13 for respectively mounting a first limited block 131 and a second limited block (the second limited block is shielded in FIG. 5 and not illustrated due to viewing angles). A first limiting slot 114 (the first limiting slot 114 is shielded in FIG. 5 and not illustrated due to viewing angles, but the first limiting slot is illustrated in FIG. 6) for limiting the maximum displacement of the first limited block 131 moving in the first direction is arranged on the first arc surface 103a of the first sleeve 11. When relative sliding occurs between the first arc surface 103a of the first sleeve 11 and the third arc surface 103b of the cross slider 13, the first limited block 131 moves in the first limiting slot. Similarly, a second limiting slot 124 for limiting the maximum displacement of the second limited block moving in the second direction is arranged on the second arc surface 105a of the second sleeve 12. When relative sliding occurs between the second arc surface 105a of the second sleeve 12 and the fourth arc surface 105b of the cross slider 13, the second limited block moves in the second limiting slot 124. When the first sleeve 11 is acted upon by the driving shaft 2, the third arc surface 103b of the cross slider 13 can translate in the X-axis direction and/or rotate around an X-axis relative to the first arc surface 103a of the first sleeve 11, the maximum translation of the cross slider 13 relative to the first sleeve 11 is limited by the cooperation of the first limiting slot and the first limited block 131, and the maximum rotation angle of the cross slider 13 relative to the first sleeve 11 is limited by the size of the first arc surface 103a. Subsequently, the cross slider 13 transmits the action of the driving shaft 2 to the second sleeve 12, so that translation in the Y-axis direction and/or rotation around a Y-axis occurs between the fourth arc surface 105b of the cross slider 13 and the second arc surface 105a of the second sleeve 12. In this process, specifically, the maximum translation of the cross slider 13 relative to the second sleeve 12 is limited by the cooperation of the second limiting slot 124 and the second limited block, and the maximum rotation angle of the second sleeve 12 relative to the cross slider 13 is limited by the size of the second arc surface 105a. Therefore, in the embodiment of the present disclosure, force transmission among the first sleeve 11, the cross slider 13 and the second sleeve 12 is realized through the matched arc structures arranged between the cross slider 13 and the first sleeve 11 and between the cross slider 13 and the second sleeve 12, and it is ensured that the cross slider 13, the first sleeve 11 and the second sleeve 12 cannot fall off during this process. Therefore, in the embodiment of the present disclosure, the cross slider coupling 1 is not only suitable for the case that the driving shaft 2 and the gripping head 3 are parallel, but also suitable for the case that the driving shaft 2 and the gripping head 3 form a certain included angle, and has an anti-falling function.

In some embodiments, the first reset assembly 14 penetrates through the interior of the second through hole 112 of the first sleeve 11, and the axial direction of the second through hole 112 is parallel to the axial direction of the third arc surface 103b of the cross slider 13. The second reset assembly 15 penetrates through the interior of the fourth through hole 122 of the second sleeve 12, and the axial direction of the fourth through hole 122 is parallel to the axial direction of the fourth arc surface 105b of the cross slider 13. Referring to FIG. 3 the structures of the first reset assembly 14 and the second reset assembly 15 are the same, and the first reset assembly 14 is described as an example. The first reset assembly 14 includes a first spring 141 penetrating through the interior of the second through hole 112 of the first sleeve 11, first spiral end covers 142 arranged at both ends of the first spring 141, first screws 143 in threaded connection with the first spiral end covers 142, and a first positioning plate 144 sleeving the first screws 143. The two first screws 143 respectively penetrate through the two first positioning plates 144 and are respectively screwed in threaded holes of the two first spiral end covers 142, so that the two first positioning plates 144 are fixed on the first sleeve 11. Both ends of the first spring 141 are respectively fixed on the two first spiral end covers 142. The force applied to the first spring 141 is adjusted by screwing the first screw 143 in and out of the first spiral end cover 142, so that the restoring force applied by the first reset assembly 14 to the first sleeve 11 is changed.

The working process of the first reset assembly 14 is as follows: when the first arc surface 103a of the first sleeve 11 moves in the positive direction of the X axis relative to the third arc surface 103b of the cross slider 13 under the action of input force (torque for rotating clockwise around a Z axis in this embodiment) transmitted by the driving shaft 2, the first positioning plate 144 in the first reset assembly 14, approaching the origin O of the coordinate system, on the first sleeve 11 is stationary relative to the cross slider 13. The first positioning plate 144 in the first reset assembly 14, away from the origin O of the coordinate system, on the first sleeve 11 moves in the positive direction of the X axis with the first sleeve 11 relative to the third arc surface 103b of the cross slider 13, and the first spring 141 is stretched. When one end face of the first limiting slot 114 on the first arc surface 103a of the first sleeve 11 contacts with the first limited block 131 mounted in the first mounting hole 132, the first sleeve 11 reaches the maximum moving distance. When acting force transmitted by the driving shaft 2 is eliminated, the first spring 141 in tension is restored, the first sleeve 11 is driven to move in the opposite direction of the X axis relative to the third arc surface 103b of the cross slider 13. At the same time, the first sleeve 11 rotates on the arc surface matched with the cross slider 13, so that an initial state of the first sleeve 11 and the cross slider 13 is restored. The working process of the second reset assembly 15 is the same as that of the first reset assembly 14, except that the second reset assembly 15 provides restoring force in the Y-axis direction to the second sleeve 12, so that the initial state of the second sleeve 12 and the cross slider 13 is restored, which is not described here.

In other embodiments, the first arc surface 103a formed at the second end face 102 of the first sleeve 11 in the first direction is a major arc that is convex to the exterior of the first sleeve 11, and the third arc surface 103b arranged on the cross slider 13 is a major arc that is concave to the interior of the cross slider 13. Similarly, the second arc surface 105a formed at fourth second end face 104 of the second sleeve 12 in the second direction is a major arc that is convex to the exterior of the second sleeve 12, and the fourth arc surface 105b arranged on the cross slider 13 is a major arc that is concave to the interior of the cross slider 13.

In other embodiments, the first arc surface 103a formed at the second end face 102 of the first sleeve 11 in the first direction is a major arc that is convex to the exterior of the first sleeve 11, and the third arc surface 103b arranged on the cross slider 13 is a major arc that is concave to the interior of the cross slider 13. The second arc surface 105a formed at fourth second end face 104 of the second sleeve 12 in the second direction is a major arc that is convex to the interior of the second sleeve 12, and the fourth arc surface 105b arranged on the cross slider 13 is a major arc that is concave to the exterior of the cross slider 13.

The working process of the cross slider coupling 1 provided by the embodiment of the present disclosure is as follows.

When the cross slider coupling 1 provided by the embodiment of the present disclosure works, rotational torque input by the driving shaft 2 is transmitted to the first sleeve 11 connected with the driving shaft 2, transmitted to the second sleeve 12 connected with the gripping head 3 through the cross slider 13, and then output by the gripping head 3. When the driving shaft 2 and the gripping head 3 are parallel but not collinear, the first sleeve 11 and the second sleeve 12 slide in the first direction and the second direction relative to the third arc surface 103*b* and the fourth arc surface 105*b* of the cross slider 13, respectively. After unloading, the first sleeve 11 and the second sleeve 12 are reset under the joint action of the two reset assemblies. The surfaces of the first arc surface 103*a* of the first sleeve 11 and the second arc surface 105*a* of the second sleeve 12 respectively contacting with the third arc surface 103*b* and the fourth arc surface 105*b* are arc surfaces, the first sleeve 11, the second sleeve 12 and the cross slider 13 cannot automatically separate, and the first sleeve 11 and the second sleeve 12 can rotate at certain angles around the axial directions of the third arc surface 103*b* and the fourth arc surface 105*b* (namely, the first direction and the second direction), respectively. Therefore, the cross slider coupling 1 in the embodiment of the present disclosure is not only suitable for the case that the driving shaft 2 is parallel to the gripping head 3, but also suitable for the case that the driving shaft 2 and the gripping head 3 form a certain included angle, so that the adjustment accuracy of a gripping plate B is reduced.

In the description of the specification, the description of the reference terms such as "one embodiment", "some embodiments", "examples", "specific examples" or "some examples" indicates to be contained in at least one embodiment or example of the disclosure in combination with specific characteristics, structures, materials or characteristics described by the embodiment or example. In the specification, schematic expression of the above terms does not necessarily refer to the same embodiment or example. Moreover, the described specific features, structures, materials or characteristics can be combined in any one or more embodiments or examples appropriately. In addition, those skilled in the art can integrate and combine different embodiments or examples and features of different embodiments or examples described in this specification without contradicting each other.

Although the embodiment of the present disclosure has already been illustrated and described, it is understood that the embodiment is exemplary but cannot be understood as limitation of the present disclosure, and the embodiment can be changed, amended, replaced and converted by those skilled in the art in the scope of the present disclosure.

What is claimed is:

1. A gripper mechanism, comprising a motor, a cylinder barrel, a piston and a guide assembly, wherein the piston reciprocates in the cylinder barrel, and the piston comprises a piston body and a piston rod located in the piston body; both ends of the cylinder barrel are respectively provided with a first cylinder head and a second cylinder head which are used for limiting a maximum distance and a minimum distance between the piston body and a part to be gripped; the piston rod comprises a driving shaft, a cross slider coupling and a gripping head which are connected in turn, the gripping head partly protrudes from the cylinder barrel, and power output by the motor is transmitted to the gripping head through the driving shaft and the cross slider coupling in turn, so that the gripping head is screwed into or out of a connecting hole in the part to be gripped to grip and release the part to be gripped;

the cross slider coupling comprises:
   a first sleeve, wherein a first through hole penetrates through a center of the first sleeve in an axial direction of the first sleeve, the first sleeve is provided with a first end face and a second end face respectively at both axial ends of the first sleeve, the first sleeve is connected with the driving shaft at the first through hole of the first end face, a first arc surface arranged in a first direction is formed in the second end face of the first sleeve, and a second through hole is further formed in the first sleeve;
   a second sleeve, wherein a third through hole penetrates through a center of the second sleeve in an axial direction of the second sleeve, the second sleeve is provided with a third end face and a fourth end face respectively at both axial ends of the second sleeve, the second sleeve is connected with the gripping head at the third through hole of the third end face, a second arc surface arranged in a second direction is formed in the fourth end face of the second sleeve, and a fourth through hole is further formed in the second sleeve;
   a cross slider, wherein the cross slider is provided with a third arc surface matched with the first arc surface on a side, facing the second end face, of the cross slider, so that relative rotation around the first direction and relative sliding in the first direction are able to be realized between the cross slider and the first sleeve; the cross slider is provided with a fourth arc surface matched with the second arc surface on a side, facing the fourth end face, of the cross slider, so that relative rotation around the second direction and relative sliding in the second direction are able to be realized between the cross slider and the second sleeve;
   a first reset assembly, wherein the first reset assembly penetrates through an interior of the second through hole for providing restoring force for reset of the cross slider relative to the first sleeve after unloading;
   a second reset assembly, wherein the second reset assembly penetrates through an interior of the fourth through hole for providing restoring force for reset of the cross slider relative to the second sleeve after unloading.

2. The gripper mechanism according to claim 1, wherein the first arc surface is a major arc that is concave to an interior of the first sleeve or convex to an exterior of the first sleeve.

3. The gripper mechanism according to claim 1, wherein the second arc surface is a major arc that is concave to an interior of the second sleeve or convex to an exterior of the second sleeve.

4. The gripper mechanism according to claim 1, wherein a first mounting hole is formed in the side, facing the first sleeve, of the cross slider, a first limited block is mounted in the first mounting hole, and a first limiting slot for limiting a maximum displacement of the first limited block sliding in the first direction is arranged on the first arc surface.

5. The gripper mechanism according to claim 1, wherein a second mounting hole is formed in the side, facing the second sleeve, of the cross slider, a second limited block is mounted in the first mounting hole, and a second limiting slot for limiting a maximum displacement of the second limited block sliding in the second direction is arranged on the second arc surface.

6. The gripper mechanism according to claim 1, wherein the first reset assembly comprises a first spring penetrating through the interior of the second through hole, first spiral end covers arranged at both ends of the first spring, first screws in threaded connection with the first spiral end covers, and first positioning plates sleeving the first screws; the first screws penetrate through the first positioning plates and are screwed in threaded holes of the first spiral end covers, so that the first positioning plates are fixed on the first sleeve; and an axial direction of the second through hole is parallel to an axial direction of the third arc surface.

7. The gripper mechanism according to claim 1, wherein the second reset assembly comprises a second spring penetrating through the interior of the fourth through hole, second spiral end covers arranged at both ends of the second spring, second screws in threaded connection with the second spiral end covers, and second positioning plates sleeving the second screws; the second screws penetrate through the second positioning plates and are screwed in threaded holes of the second spiral end covers, so that the second positioning plates are fixed on the second sleeve; and an axial direction of the fourth through hole is parallel to an axial direction of the fourth arc surface.

8. The gripper mechanism according to claim 1, wherein the driving shaft and the gripping head are parallel to each other or form an included angle.

9. The gripper mechanism according to claim 1, wherein the cross slider coupling and the gripping head are connected to each other through a shaft clamp for preventing the gripping head from retracting into a cavity of the piston body.

* * * * *